United States Patent [19]

Taylor

[11] 3,932,749

[45] Jan. 13, 1976

[54] ELECTRON GUN

[75] Inventor: Norman J. Taylor, Los Altos, Calif.

[73] Assignee: Varian Associates, Palo Alto, Calif.

[22] Filed: Mar. 22, 1974

[21] Appl. No.: 454,038

[52] U.S. Cl. ................. 250/306; 250/307; 328/233

[51] Int. Cl.$^2$ ........................................... G01N 23/00

[58] Field of Search ........... 250/305, 306, 307, 309, 250/310, 311; 328/233

[56] References Cited

UNITED STATES PATENTS

| | | | |
|---|---|---|---|
| 3,191,028 | 6/1965 | Crewe | 250/305 |
| 3,597,608 | 8/1971 | Gutter | 250/307 |
| 3,597,609 | 8/1971 | Anger et al. | 250/307 |
| 3,644,733 | 2/1972 | Wolff et al. | 250/310 |
| 3,787,696 | 1/1974 | Dao et al. | 250/307 |
| 3,801,784 | 4/1974 | Wittry | 250/306 |

*Primary Examiner*—James W. Lawrence
*Assistant Examiner*—D. C. Nelms
*Attorney, Agent, or Firm*—Stanley Z. Cole; Leon F. Herbert; John J. Morrissey

[57] ABSTRACT

Electron gun having a source of electrons, means for forming the electrons into a beam directed along an axis, and an output electrode comprising a plurality of semi-cylindrical plates disposed coaxially of the axis of the beam. This electrode is part of the final lens of the gun, and voltages for deflecting the beam and correcting astigmatism are superposed on the plates of this electrode.

8 Claims, 4 Drawing Figures

ELECTRON GUN

BACKGROUND OF THE INVENTION

This invention pertains generally to electron guns and more particularly to an electron gun which is particularly suitable for use in an Auger spectrometer.

In Auger analysis, where an electron beam is directed at a sample to be analyzed, it is essential that the beam be sharp and well defined to provide high resolution and freedom from distortion. Toward this end, it is desirable that the final lens in the gun producing the beam be positioned as close to the sample as possible.

Electron guns generally include deflection plates for deflecting the beam to effect scanning of the sample and some means for correcting astigmatism in the beam. In the guns of the prior art, the deflection plates and astigmatism corrector are commonly located between the final lens and the sample, and they prevent the lens from being positioned as close to the sample as would otherwise be desirable.

SUMMARY AND OBJECTS OF THE INVENTION

In the electron gun of the invention, the functions of the deflection plates and astigmatism corrector are combined in one element of the final lens which can be positioned as close to the sample as desired. This electrode comprises a plurality of semi-cylindrical plates disposed coaxially of the beam axis, and voltages for deflecting the beam and correcting astigmatism are superposed on these plates.

It is in general an object of the invention to provide a new and improved electron gun.

Another object of the invention is to provide an electron gun in which the functions of the final lens, deflection plates and astigmatism control are combined in one element of the final lens.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
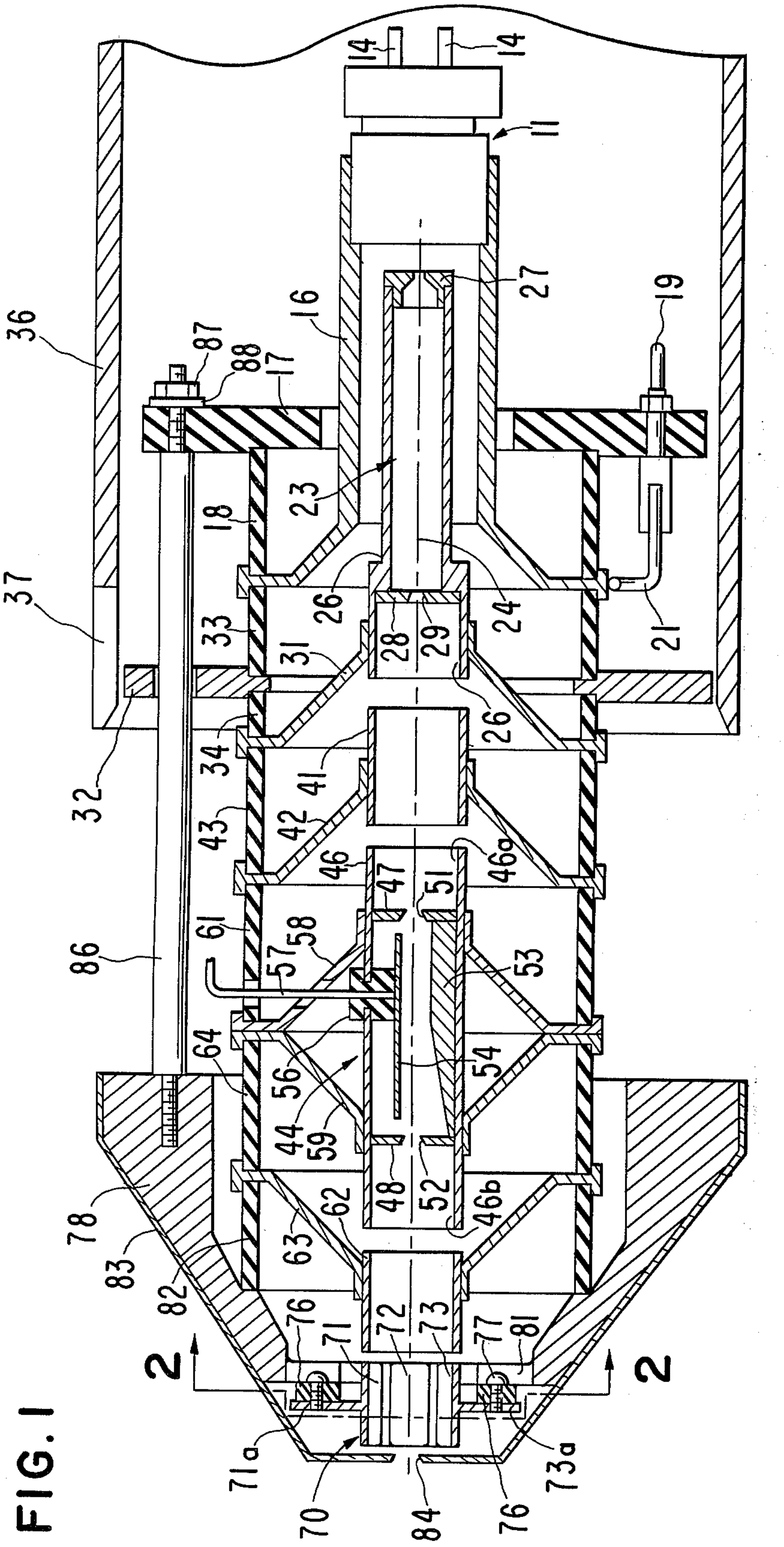
FIG. 1 is a center line sectional view of one embodiment of an electron gun according to the invention.
Figure 2:
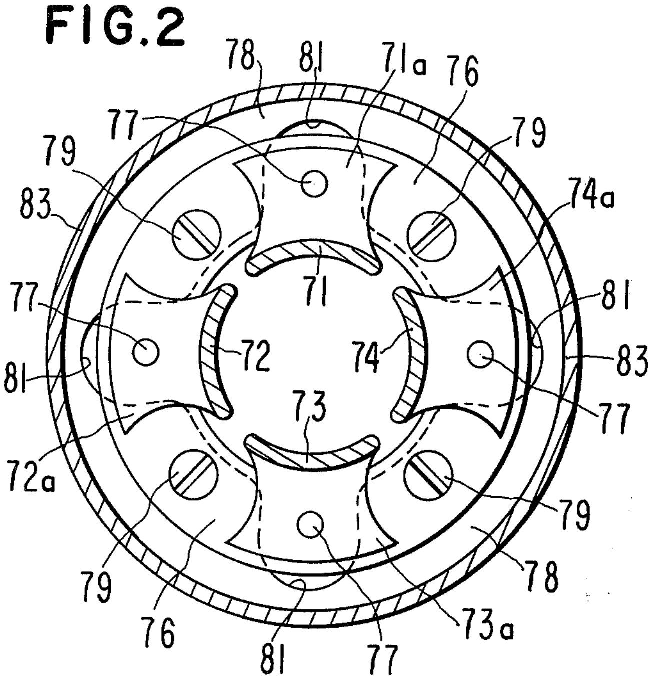
FIG. 2 is an enlarged cross sectional view taken along line 2—2 in FIG. 1.
Figure 3:
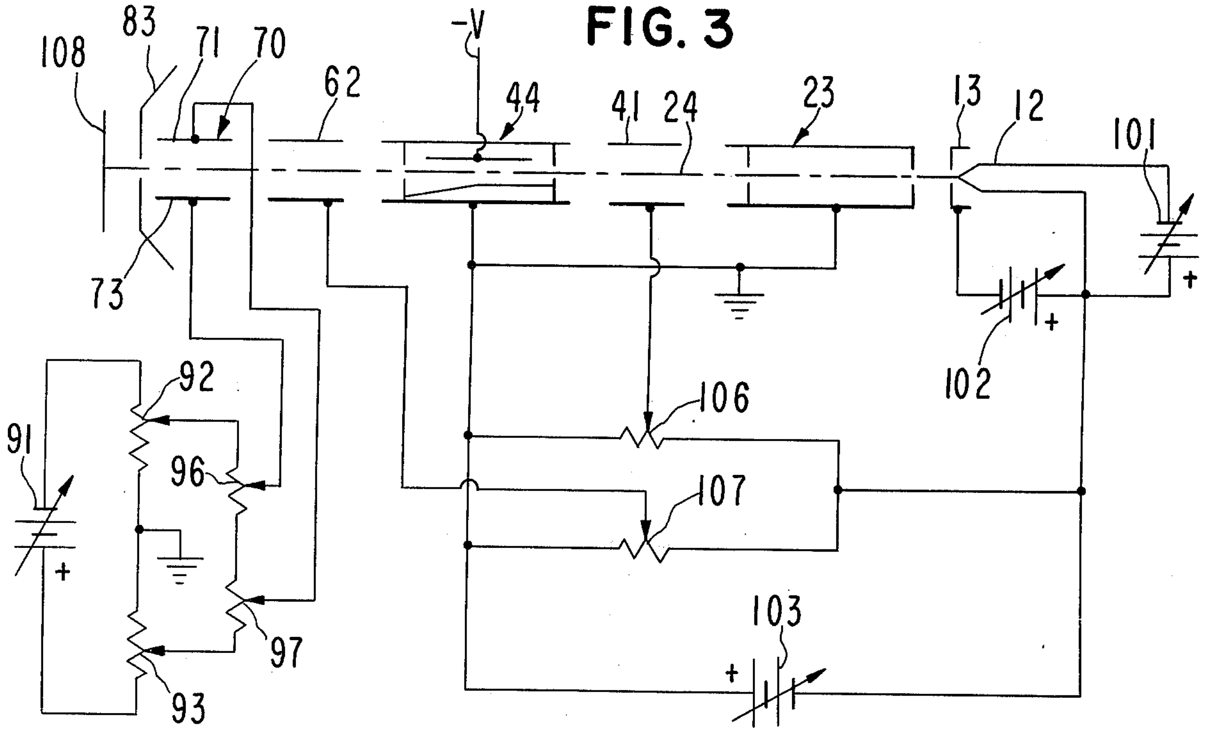
FIG. 3 is a circuit diagram illustrating the application of operating voltages to the electron gun of FIG. 1.

As illustrated in FIGS. 1–3, the electron gun includes a filament assembly 11 comprising a filament element 12 fabricated of a suitable material such as tungsten ribbon and a Wehnelt electrode 13. Pins 14 are connected to the filament and are adapted to be received in a socket to which power for heating the filament is applied. The filament assembly is supported by a mounting bracket 16 which is spaced from a circular base 17 by a spacer 18. Bracket 16 is connected electrically to one side of filament 12 and to a connector pin 19 mounted on base 17. The connection to pin 19 is made by a conductor 21 which is attached to the bracket by suitable means such as spot welding.

An anode assembly 23 accelerates the electron beam from filament assembly 11 along an axis 24. The anode assembly is of known design, and it includes an axially elongated tubular body 26, an end cap 27, and circular aperture plate 28 having an axially disposed aperture 29. The anode assembly is supported by a mounting bracket 31 affixed to tubular body 26.

Means is provided for dissipating heat produced by electrons which strike plate 28 instead of passing through aperture 29. This means includes an annular ring 32 which is supported between mounting brackets 16 and 31 by annular spacers 33 and 34. Ring 32 is fabricated of a thermally conductive material such as copper, and it is positioned to be engaged by a cylinder 36 in the spectrometer in which the electron gun is used. This cylinder is likewise fabricated of a thermally conductive material, and its forward end is slotted, as indicated at 37, to form fingers for gripping ring 32. The other end of the cylinder is connected to a cooling duct or heat sink in the spectrometer.

An electrostatic lens element 41 is disposed coaxially of the electron beam adjacent to anode assembly 23. This element comprises an annular tube 41 which is supported by a mounting bracket 42 separated from bracket 31 by an annular spacer 43.

A second anode and blanking assembly 44 is positioned adjacent to lens 41. This assembly comprises an axially elongated tubular body 46 in which aperture plates 47 and 48 are mounted. These plates are formed to include axially disposed rear and front apertures 51 and 52, respectively. Assembly 44 also includes a ramp member 53 which is electrically connected to the body and aperture plates and a modulation electrode 54 which is insulated therefrom. Electrode 54 is mounted on an insulative spacer 56 carried by body 46, and electrical connections to the electrode are made by a conductor 57 which is connected to a pin similar to pin 19 in base 17. Assembly 44 is supported by mounting brackets 58 and 59 which are separated from bracket 42 by an annular spacer 61.

A second electrostatic lens element 62 is positioned along the beam axis in front of anode and blanking assembly 44. This element is similar to lens 41, and it is supported by a mounting bracket 63 which is separated from bracket 59 by an annular spacer 64.

A deflector and astigmatism correcting electrode 70 is mounted in front of lens 62. This electrode consists of four semi-cylindrical plates 71–74 disposed in quadrature about beam axis 24. Plates 71–74 are provided with radially extending mounting lugs **71*a*–74*a* which are secured to an annular mounting ring 76 by screws 77. Ring 76 is mounted on a conical nose block 78 by screws 79, and portions of the block are cut away, as indicated at 81, to provide clearance for the heads of screws 77. An annular spacer 82 is disposed between bracket 63 and an axially facing annular shoulder formed on block 78, and a cover 83 having an axial aperture 84** is mounted on the outside of the block.

Lens element 41 and the adjacent end sections **26*a* and 46*a* of tubular members 26 and 46 cooperate to form a first three element cylindrical lens, and lens element 62 cooperates with the adjacent end section 46*b* of tubular member 46 and electrode 70** to form a second three element cylindrical lens.

The gun is held together by elongated rods 86, the front ends of which are threadedly mounted in nose block 78. In the preferred embodiment, three such rods are provided, and they are spaced equally about beam axis 24. The rear ends of rods 86 pass through openings in base 17, and nuts 87 and spring washers 88 are mounted thereon. The nuts are tightened to draw base 17 and nose block 78 together, thereby clamping the annular spacers, mounting brackets and cooling ring 32 securely together to form a rigid structure.

In the preferred embodiment, the annular spacers, spacer 56 and mounting ring 76 are all fabricated of an electrically insulative material such as a high temperature ceramic material; the mounting brackets, anode assemblies, lenses, electrode plates 71–74, nose block 78 and rods 86 are fabricated of stainless steel; and aperture plates 28, 47 and 48 are fabricated of molybdenum. Connections to anode 23, lenses 41 and 62 and electrode plates 71–74 are made by conductors connected to pins similar to pin 19 mounted in base 17. External connections to the pins on the base and to filament pins 14 are made by sockets forming a part of the spectrometer or other apparatus with which the gun is used.

.Means is provided for applying potentials to electrode plates 71–74 to deflect the elctron beam and to correct astigmatism in the beam. This means includes an adjustable source 91 with astigmatism correction potentiometers 92 and 93 connected in series therewith. The junction of these potentiometers is grounded, and deflection potentiometers 96 and 97 are connected in series with the wipers of potentiometers 92 and 93. The wipers of potentiometers 96 and 97 are connected to plates 71 and 73. A similar source and set of potentiometers can be provided for plates 72 and 74, if desired.

Operation and use of the electron gun can be described with reference to FIG. 3. A suitable voltage source 101 is connected to filament 12, and a source 102 is connected between filament 12 and Wehnelt electrode 13 to maintain that electrode at a more negative potential than the filament. The filament is maintained at a high negative potential, commonly known as the beam voltage, by a source 103 connected between the filament and ground, and anodes 23 and 44 are grounded. Negative potentials are applied to lenses 41 and 62 by voltage dividing potentiometers 106 and 107 connected to source 103. In the preferred embodiment, the voltage produced by source 91 is derived from the beam voltage produced by source 103 and is proportional thereto.

Electrons emitted by filament 12 are formed into an axially directed beam, accelerated and focused by Wehnelt electrode 13, first anode 23, lens 41 and second anode 44. Additional focusing of the beam is provided by lens 62, and the beam is directed toward a specimen 108. Potentiometers 106 and 107 are adjusted to adjust the focusing provided by lenses 41 and 62.

Blanking or interruption of the beam can be effected by applying a negative potential –V to modulation electrode 54 via conductor 57. When this potential is applied, the electron beam which normally passes through aperture 52 will be deflected so that it strikes plate 48 and is blocked or interrupted.

Astigmatism in the beam is corrected by adjusting potentiometers 92 and 93 to apply potentials of the same magnitude and polarity to plates 71 and 73. If the beam is elongated in the direction of a plane intersecting plates 71 and 73, the astigmatism can be corrected either by applying a negative potential to plates 71 and 73 or by applying a positive potential to plates 72 and

74. Likewise, if the beam is elongated in the direction of an axial plane intersecting plates 72 and 74, this astigmatism can be corrected either by applying a positive potential to plates 71 and 73 or by applying a negative potential to plates 72 and 74.

Scanning of sample 108 is effected by moving the wipers of potentiometers 96 and 97 to vary the potential applied to plates 71 and 73 at the desired scanning rate. Potentiometers 96 and 97 are preferably ganged together, and in the absence of astigmatism, they apply deflection voltages of equal magnitude and opposite polarities to plates 71 and 73. The deflection and astigmatism correction potentials are superposed, and when potentiometers 92 and 93 have been adjusted to correct an astigmatism, the voltages delivered to the plates differ in magnitude by an amount corresponding to the voltage required to eliminate the astigmatism. For example, with deflection voltages of +200V and –200V and a correction voltage of –50V, the net voltages applied to the plates are +150V and –250V.

Figure 4:
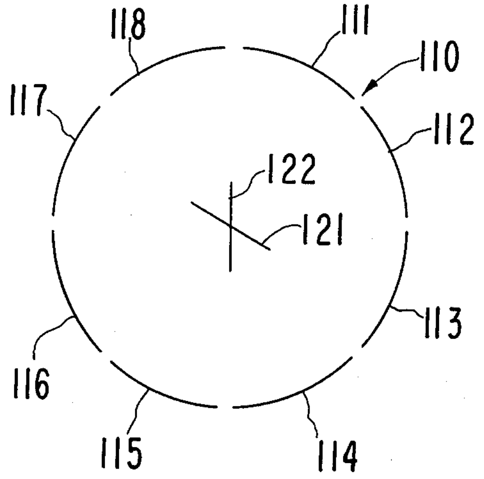
FIG. 4 is a schematic illustration of an eight pole output electrode for use in the electron gun of the invention.

FIG. 4 schematically illustrates an output electrode 110 having eight semi-cylindrical plates 111–118 spaced equally about beam axis 24. This eight pole electrode can be utilized in place of electrode 70 in the electron gun of the invention. Plates 111–118 are mounted in a manner similar to plates 71–74, and they are provided with deflection and astigmatism correcting potentials in a manner similar to plates 71–74. The eight plate electrode provides somewhat greater flexability of operation than the four plate electrode. For deflection, adjacent pairs of plates are connected together, and potentials of equal magnitude and opposite polarity are applied to diametrically opposed pairs of plates. For example, plates 111 and 118 can be connected together, as can plates 114 and 115, and deflection potentials of equal magnitude and opposite polarities can be applied to the two pairs of plates. An astigmatism consisting of an elongation of the beam in the direction of an axial plane intersecting diametrically opposed plates can be corrected either by applying equal negative potentials to the intersected plates or by applying equal positive potentials to the plates in quadrature with the intersected plates. For example, an elongation of the beam in the direction indicated by line 122 can be corrected by applying equal negative potentials to plates 111 and 118 and to plates 114 and 115. This elongation can also be corrected by applying equal positive potentials to plates 112 and 113 and to plates 116 and 117.

While in the preferred embodiment deflection and astigmatism correction are combined in the final element 70 of the three element lens, the astigmatism correction can be incorporated into the first element of the lens, namely section **46*b* of tubular member 46, by forming that section as a plurality of semi-cylindrical plates similar to plates 71–74.**

The invention has a number of important features and advantages. Electrode 70 forms a part of the final lens of the gun, and this lens can be positioned very close to a sample to provide a beam which is sharp and well defined. The semi-cylindrical plates assure that axial symmetry is maintained in the lens region in the absence of deflection or correction voltages. The gun is highly compact and particularly suitable for use in an Auger spectrometer.

It is a apparent from the foregoing that a new and improved electron gun has been provided. While only the preferred embodiments have been described, as will be apparent to those familiar with the art, certain changes and modifications can be made without departing from the scope of the invention as defined by the following claims.

I claim:

1. In an electron gun: a source of electrons, means for forming the electrons into a beam directed along an axis, a three element cylindrical lens having an output electrode comprising a plurality of semicylindrical plates disposed coaxially of the beam at a predetermined location along the axis, means for applying a deflection potential to the plates to deflect the beam from the axis, and means for applying a correction potential to the plates to correct astigmatism in the beam.

2. The electron gun defined by claim 1 wherein the deflection potential and the correction potential are superposed concurrently on the same plates.

3. The electron gun defined by claim 1 wherein the output electrode comprises four semi-cylindrical plates disposed in quadrature about the axis of the beam.

4. The electron gun defined by claim 1 wherein the output electrode comprises eight semi-cylindrical plates spaced equally about the axis of the beam.

5. The electron gun defined by claim 1 further including an aperture through which the beam normally passes disposed between the means for forming the beam and the output electrode and means for deflecting the beam away from the aperture to interrupt the beam.

6. In an electron gun: a source of electrons, means for forming the electrons into a beam directed along an axis toward a target, a first cylindircal lens assembly comprising a plurality of axially spaced apart cylindrical electrodes disposed coaxially of the beam between the source and the target for focusing the beam along the axis, a second cylindrical lens assembly disposed coaxially of the beam between the first lens assembly and the target and including an electrode comprising a plurality of semi-cylindrical plates at a predetermined location along the axis, means for applying a deflection potential to the plates to deflect the beam from the axis, and means for applying a correction potential to the plates to correct astigmatism in the beam, the deflection and correction potentials being superposed concurrently on the same plates.

7. The electron gun of claim 6 further including a blanking assembly disposed between the first and second lens assemblies comprising an aperture aligned with the axis through which the beam normally passes and means for deflecting the beam away from the aperture to interrupt the beam at the target.

8. The electron gun of claim 6 wherein the electrode comprising a plurality of semi-cylindrical plates is the output electrode of the second cylindrical lens assembly.

* * * * *